United States Patent [19]
Richter

[11] 3,759,576
[45] Sept. 18, 1973

[54] CUSTOM WHEEL ASSEMBLY
[75] Inventor: Roy E. Richter, Downey, Calif.
[73] Assignee: Crager Industries, Inc., Compton, Calif.
[22] Filed: Oct. 18, 1971
[21] Appl. No.: 189,971

Related U.S. Application Data
[63] Continuation-in-part of Ser. No. 107,220, July 18, 1971, which is a continuation-in-part of Ser. No. 83,049, Oct. 22, 1970, abandoned.

[52] U.S. Cl. ............................................. 301/9 DN
[51] Int. Cl. .............................................. B60b 3/16
[58] Field of Search ........................... 301/9 DN, 36

[56] References Cited
UNITED STATES PATENTS
3,459,455    8/1969    Meunch ........................... 301/9 DN
3,329,468    7/1967    Beith ................................ 301/9 DN
3,649,079    3/1972    English ............................ 301/9 DN Primary Examiner—Richard J. Johnson
Attorney—Warren T. Jessup et al.

[57] ABSTRACT

A custom wheel assembly is provided which is adapted for universal mounting on automobiles having, within a given range, different lug bolt circle radii. The weeel assembly of the invention includes a wheel with holes of sufficiently large diameter to fit over the lug bolts of most present day automobiles, and it also includes an adapter member with integral bushings adapted to fit into the holes in the wheel and with the bores of the bushings aligned with the lug bolts of the particular automobile drive drum on which the wheel is mounted, a different adapter member being required for each of the various lug bolt radii used in the different makes of present day automobiles.

8 Claims, 21 Drawing Figures

PATENTED SEP 18 1973 3,759,576

INVENTOR:
Roy E. Richter
Jessup and Beecher
By Warren T. Jessup
ATTORNEYS

PATENTED SEP 18 1973  3,759,576

*INVENTOR.*
ROY E. RICHTER
BY JESSUP & BEECHER
Warren T. Jessup
ATTORNEYS 3,759,576

INVENTOR:
Roy E. Richter
Jessup and Bucher

ATTORNEY.

3,759,576

CUSTOM WHEEL ASSEMBLY

BACKGROUND OF THE INVENTION

This application is a continuation-in-part of U.S. Pat. application Ser. No. 107,220, which was filed Jan. 18, 1971, and which, in turn, was a continuation-in-part of U.S. Pat. application Ser. No. 83,049, filed Oct. 22, 1970, both now abandoned, entitled CUSTOM WHEEL ASSEMBLY.

Decorative wheels are presently available for automobiles and these wheels are intended to replace the standard wheels with which the automobiles are normally equipped. These decorative wheels are usually formed of highly polished aluminum or magnesium. A problem has arisen in the sale of such decorative wheels in that the lug bolt radii of different makes of automobiles varies, which, in the past, usually meant that the dealer had to stock an excessively large number of such decorative wheels in order to be able to fit the different makes of automobiles.

Adapters of various types have been suggested in the prior art in order that a single type of decorative wheel may be used universally on all the major makes of automobiles. The present invention provides an improved type of custom wheel-adapter assembly which is constructed so that the dealer need stock but a single type of custom wheel which may be universally mounted on all major makes of automobiles, and which is so mounted by means of a relatively inexpensive adapter member. In this way, the dealer can stock a minimum number of the expensive custom wheels, and may also stock a number of different types of inexpensive adapter members, so as to permit the custom wheels to be universally mounted on the different makes of automobiles.

DETAILED DESCRIPTION OF THE ILLUSTRATED EMBODIMENTS

Figure 1:
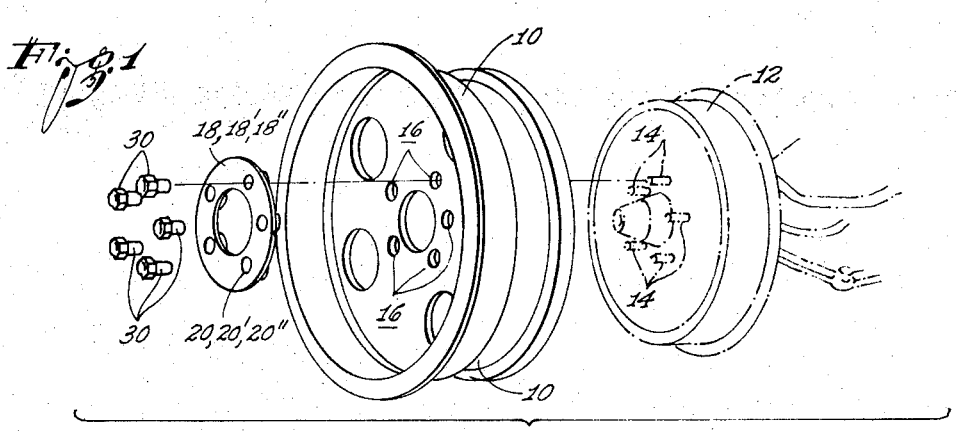
FIG. 1 is a perspective exploded view showing the manner in which the assembly of one embodiment of the present invention is mounted on the drive drum of an automobile.

The custom wheel portion of the assembly of the present invention may take the form shown as 10 in FIG. 1, for example. This wheel, as is common with all wheels, includes a rim portion for supporting the usual pneumatic tire, and it also includes a central web or spider portion which serves to support the wheel on the wheel-mounting hub 12 of the automobile.

As illustrated in FIG. 1, the hub 12 includes a plurality of lug bolts 14 which protrude out from the hub at a particular bolt circle radius. It has been found that most major makes of automobiles use three different diameter bolt circles, these being 4-½ inches, 4-¾ inches and 5 inches. Therefore, adapter plates serving to adapt the custom wheel 10 to these three different bolt circle radii will enable the custom wheel to be mounted on virtually all present day automobiles.

Figure 2:
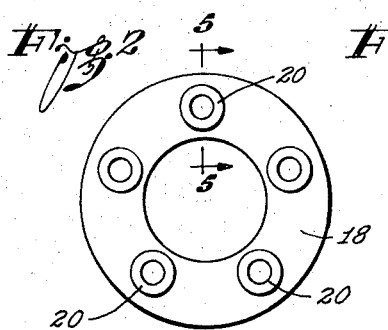
FIGS. 2, 3 and 4 respectively represent different adapter members incorporating the principles of the first embodiment of the invention and which are adapted to fit over three standard bolt circle radii so as to be universally adapted to most domestic makes of automobiles.

The central web or spider portion of the wheel 10 includes a plurality of mounting holes 16. Each of these holes has a transverse dimension large anough to receive the lug bolts 14, regardless of the actual bolt circle radii of the particular lug bolts on the drum 12. An adapter plate 18 is provided which fits over the central mounting portion 10a of the wheel and which, as shown in FIG. 2, for example, includes a plurality of integral bushings 20. Each of the integral bushings 20 has an outer dimension which corresponds to the transverse dimension of the corresponding hole 16 so that the adapter plate may be securely supported on the web portion with its bushings extending into the holes 16.

Figure 3:
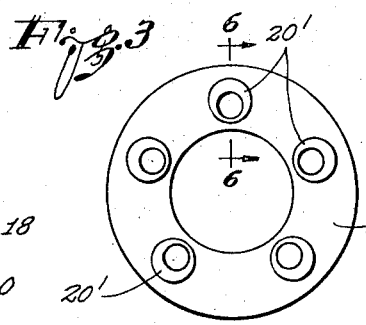
Figure 4:
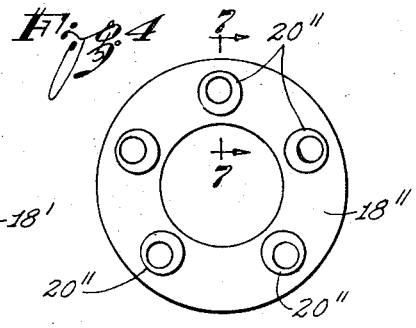
Figure 5:
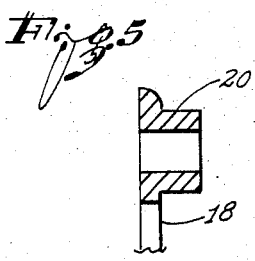
FIG. 5 is a section through the line 5—5 of FIG. 2.
Figure 6:
FIG. 6 is a section through the line 6—6 of FIG. 3.
Figure 7:
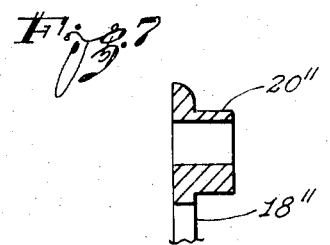
FIG. 7 is a section through the line 7—7 of FIG. 4.

The bores of the bushings 20 are aligned with the particular lug bolts 14 on the particular hub 12 on which the wheel 10 is mounted. For example, the adapter plate 18 of FIGS. 2 and 5 has the bores of its bushings centrally disposed so that it will fit over the lug bolts 14, for example, at the standard bolt circle of 4-¾ inches. On the other hand, the adapter plate 18' of FIGS. 3 and 6 has the bores of its bushings 20' displaced radially inwardly, so that the adapter plate may be used in conjunction with a hub 12 having its lug bolts at a bolt circle diameter of 4-½ inches. Likewise, the adapter plate 18" of FIGS. 4 and 7 has the bores of its bushings 20" displaced radially outwardly, so that the adapter plate may be fitted over the lug bolts 14, when the lug bolts are disposed at the standard bolt circle of 5 inches. By selecting the proper adapter plate, the wheel 10 can be mounted on the different types of hubs 12 whose lug bolts are disposed at different bolt circle diameters. It is to be understood that, although five in number of such lug bolts 14 are shown, any number of lug bolts could be employed, such as four.

The adapter plate 18 is held in place on the web portion of the wheel 10, and the wheel 10 is held on the hub 12, by appropriate sleeve nuts 30 which are threaded onto the lug bolts 14 and which extend into the bores of the various integral bushings 20, 20' and 20''. In each case, the outer diameter of the sleeve nut 30 corresponds to the inner diameter of the bores. Instead of sleeve nuts, ordinary tapered lug nuts may be used, if so desired.

Figure 8:
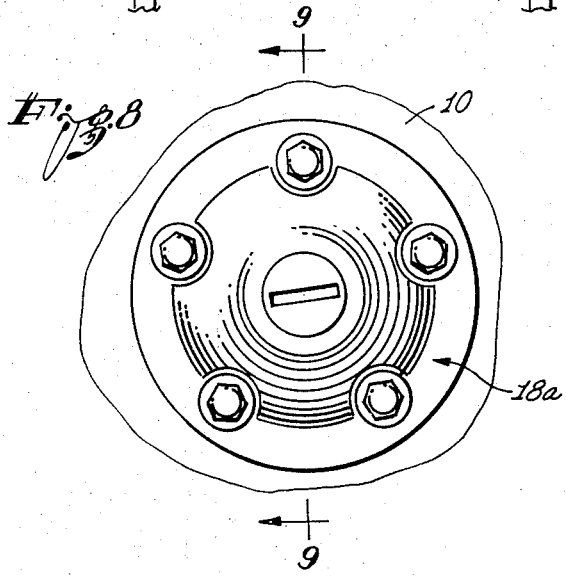
FIG. 8 is an adapter member like the adapter member of FIG. 2, for example, but representative of a second embodiment of the invention.
Figure 9:
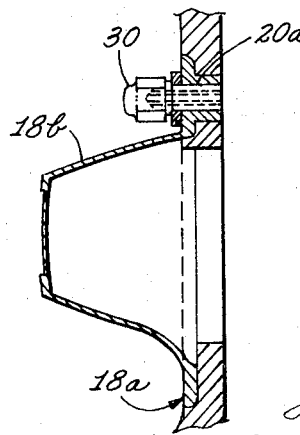
FIG. 9 is a section taken essentially along the line 9—9 of FIG. 8 and additionally showing the adapter member fitted onto the central mounting portion of the custom wheel.
Figure 10:
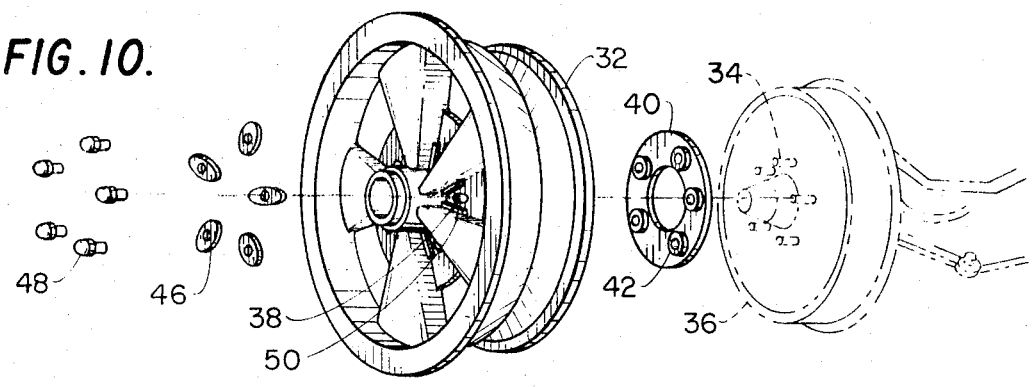
FIG. 10 is a view similar to FIG. 1 but showing a modification of the assembly of this invention.
Figure 11:
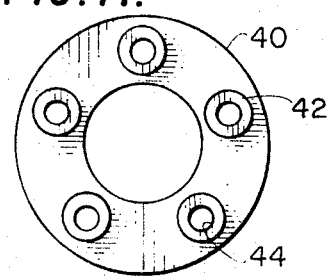
FIGS. 11, 12 and 13 respectively represent different adapter members of the type of adapter member which is to be employed within the modification of FIG. 10.
Figure 12:
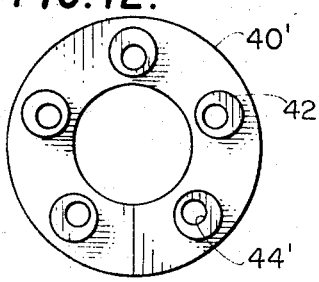
Figure 13:
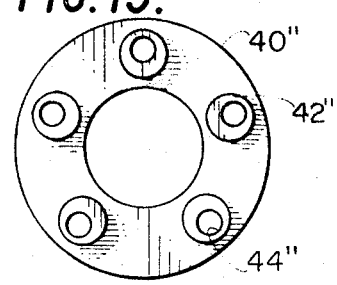
Figure 14:
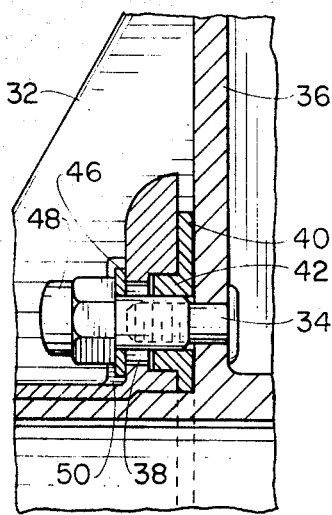
FIG. 14 is a cross sectional view of one of the lug bolt and adapter member assemblies employed within this invention.
Figure 15:
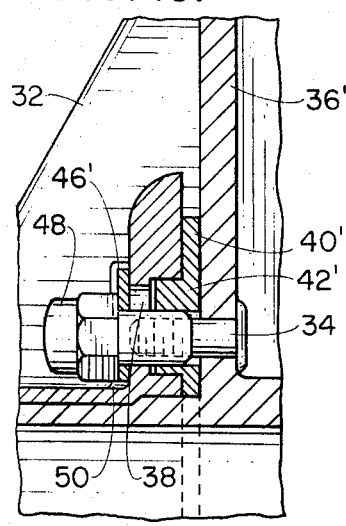
FIG. 15 is a view similar to FIG. 14 but of a different adapter member design.
Figure 16:
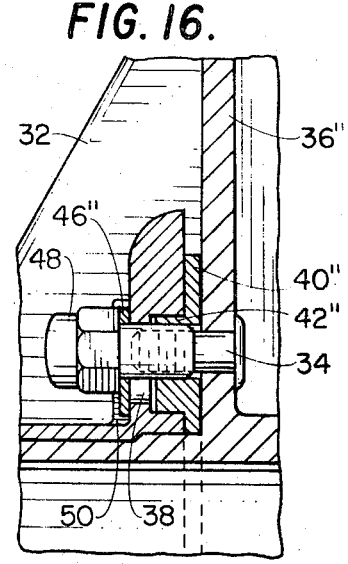
FIG. 16 is a view similar to FIG. 14 but of a further different adapter member construction.

The adapter plate 18a of FIG. 8 is generally similar to the adapter plate 18, 18' and 18'' described above, except that the latter adapter plate has a protruding central portion which defines a hubcap 18b, as best shown in FIG. 9. The adapter plate 18 has integral bushings such as the bushing 20a, as in the previous embodiment, and the sleeve nut 30 is shown as extending down into the bore of the bushing 20a to be threaded onto the corresponding lug bolt 14.

Referring particularly to FIGS. 10–16 of the drawings, a modified form 32 of the custom wheel is shown. The lug bolts 34, which protrude out from the wheel mounting hub 36, are each to cooperate with a respective mounting hole 38 located within the custom wheel assembly 32. An adapter plate 40 includes a plurality of equiangularly spaced apart bushings 42 secured thereto. A bore 44 is formed through each of the bushing 42 of the adapter plate 40. It is to be noted that the bore 44 of the adapter plate 40 is centrally mounted with respect to each of the bushings 42. It is also to be noted that the adapter plate 40 is to be located between hub 36 and the custom wheel assembly 32 with each bore 44 cooperating with a lug bolt 34. The lug bolts 34 then extend through each of the mounting holes 38 within the custom wheel 32. A washer 46 is then to be located about each of the lug bolts 34 and adjacent the custom wheel 32. Sleeve nuts 48 are then to be located about each of the lug bolts 34 with the sleeve portion of each nut 48 extending through the opening in the washer and into the bushing 42 of the adapter plate 40. The head portion of the sleeve nut 48, when completely tightened down, will be in an abutting relationship to the washer 46.

The foregoing design, using the centrally located bores 44, is adapted to cooperate with a lug bolt circle radius of 4-¾ inches. If the lug bolt radius is 4-½ inches, the adapter plate 40' is employed having bushings 42' and off-center bores 44'. The bores 44' are off-center in the direction toward the center point of the adapter plate 40'. It is to be understood when the adapter 40 is employed, a washer 46' will be employed which has a similar off-center opening. During the tightening of the sleeve nut 48, because of the off-center opening of the washer 46', the washer 46' will tend to rotate. This is undesirable and is to be prevented by the inclusion of a shoulder 50 located on each side of the mounting holes 38. The shoulder 50 arrangement is such that the washer 46' just fits in between the adjacent shoulders in a snug fitting manner.

The adapter plate 40'' has similar bushings 42'' with bores 44'' located in an off-center arrangement within the bushings 42''. The off-center arrangement of the bores 44'' is just the opposite of that of the bores 44' in that they extend outwardly away from the center point of the adapter plate 40''. The adapter plate 40'' is to be employed with a five inch lug bolt radius. The washer 46' can also be employed with the adapter plate 40''. The only difference is that the washer 46' is turned around prior to insertion. This turning of the washer 46' puts the off-center opening in the desired position. Again, the sleeve nut 48 is tightened down in a similar manner with rotation of the washer 46' being prevented by means of the shoulders 50.

In the embodiment shown in FIGS. 17–21, the custom wheel portion of the assembly may be similar in some respects to the wheel of FIG. 1, and is designated 100. The wheel 100, like the wheel of FIG. 1, includes a rim portion for supporting the usual pneumatic tire, and it also includes a central web portion which serves to support the wheel on the wheel mounting hub 12 of the automobile.

Figure 17:
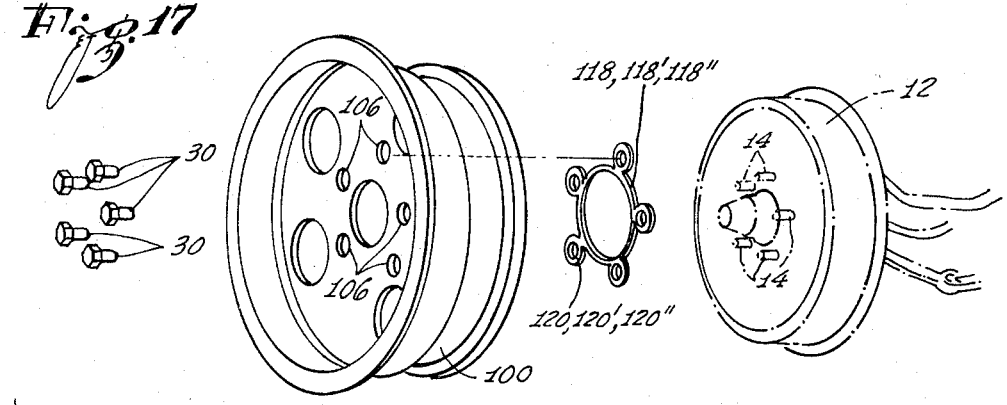
FIG. 17 is a perspective exploded view showing the manner in which the assembly of a further embodiment of the invention is mounted on the drive drum of an automobile.

As shown in FIG. 17, the hub 12 includes a plurality of lug bolts 14 which protrude out from the hub at a particular bolt circle radius. As explained above, most major makes of automobiles use three different diameter bolt circles, these being 4-½ inches, 4-¾ inches and 5 inches. Therefore, three separate adapter members are required, as in the previous embodiments, to adapt the custom wheel 100 to the three different bolt circle radii so as to enable the custom wheel 100 to be mounted conveniently on virtually all present day automobiles.

Figure 18:
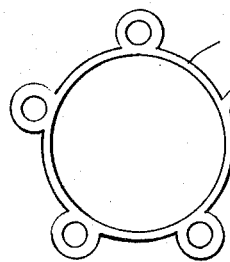
FIGS. 18, 19 and 20 resepctively represent different adapter members for use in said further embodiment of FIG. 17.
Figure 19:
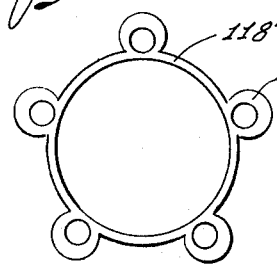
Figure 20:
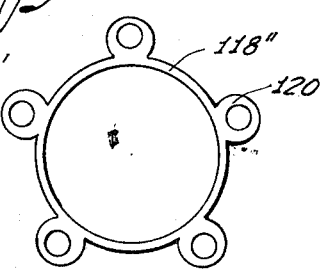

The central web portion of the wheel 100 includes a plurality of mounting holes 106. Each of these holes has a transverse dimension large enough to receive the lug bolts 14, regardless of the actual bolt circle radii of the particular lug bolt on the drum 12. In the embodiment of FIGS. 17–21, three separate adapter members are provided, these being shown in FIGS. 18, 19 and 20 respectively, and being respectively designated 118, 118' and 118''. As shown in FIGS. 18, 19 and 20, the adapter members each include an inner ring-like portion, and a plurality of bushings designated 120, 120' and 120'' respectively, formed integral with the ring portion at equiangular spaced positions around the periphery thereof. Each of the bushings 120, 120' and 120'' has an outer dimension which corresponds to the inner dimension of the corresponding hole 106, so that each adapter member may be securely supported in an annular channel 130 (FIG. 21) on the web portion with its bushings extending into the holes 106.

As in the previous embodiment, the bores of the bushings 120 are aligned with the particular lug bolt 14 on the particular hub 12 on which the wheel 10 is mounted. For example, the adapter member 118 of FIG. 18 has the bores of its bushings centrally disposed so that it will fit over the lug bolts 14, for example, at the standard bolt circle of 4-¾ inches. The adapter member 118' of FIG. 19, on the other hand, has the bores of its bushings 120' displaced inwardly, so that the adapter member 118' may be used in conjunction with a hub 12 having its lug bolts at a bolt circle diameter of 4-½ inches. Likewise, the adapter member 118'' of FIG. 20 has the bores of its bushings 120'' displaced radially, so that the adapter member 118'' may be fitted over the lug bolts 14, when the lug bolts are disposed in a bolt circle of 5 inches. Therefore, as before, by selecting the proper adapter member, the wheel 100 may be mounted on various types of hubs 12 whose lug bolts are disposed at different bolt circle diameters.

The adapter member 118 mounts somewhat loosely in the annular channel 130 in the web of the wheel 100, and the wheel 100 is held on the hub 12, by appropriate sleeve nuts 30 which, as in the embodiment of FIG. 1, are threaded onto the lug bolts 14 and which extend into the bores of the various bushings 120, 120' or 120''. In each case, the outer dimension of the sleeve nut corresponds to the inner dimension of the bores of the bushings, whereas the outer dimension of the bushings corresponds to the transverse dimensions of the holes 106.

Figure 21:
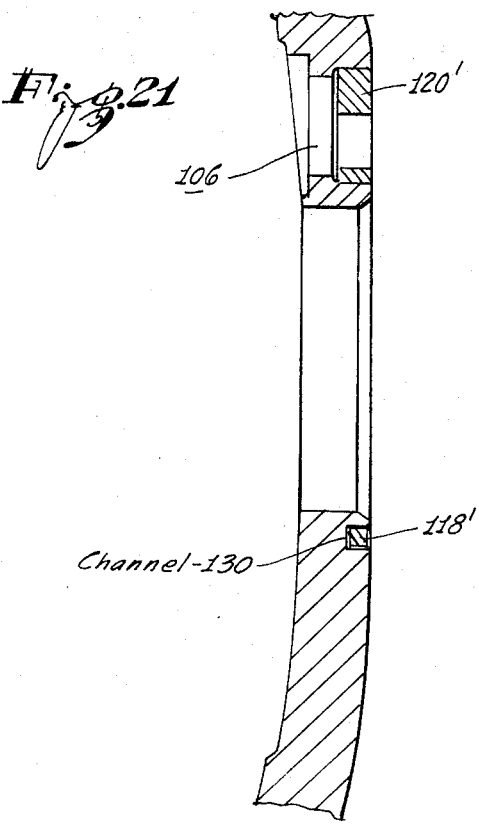
FIG. 21 is a sectional view of the further embodiment of FIG. 17.

It will be noted that the adapter member in the embodiment of FIGS. 17-21 is supported, as in the embodiment of FIGS. 10-16 between the hub and the web of the custom wheel 100. It will also be observed that the bushings 120, 120' and 120'' extend into the rear end of the corresponding holes 106, as shown in FIG. 21, and these rear ends of the holes 106 are counterbored, as shown, to receive the bushings, such as the bushing 120' in FIG. 21, and as also shown with respect to the holes 38 in FIGS. 14-16.

The assembly shown in FIGS. 17-21 is advantageous in that the adapter member is lighter in weight and simpler than in the previous embodiments, and also is less costly to manufacture.

The invention provides, therefore, a simple and improved assembly whereby a custom wheel may be constructed for universal mounting on a variety of makes of automobiles having their lug bolts disposed at different bolt circle diameter. The improved wheel assembly of the invention is mounted universally on the different makes of automobiles by a simple and inexpensive adapter plate which is held securely in place by nuts, such as the sleeve nuts described above, and which also serve to hold the wheel securely on the wheel-mounting hub of the automobile.

It will be understood that numerous combinations of several variables are here contemplated. The adapter exemplified by 18 in FIG. 1 may be placed, either on the outer face of the wheel, as in FIG. 1, or on the inner face, as in FIGS. 10 and 17. The ring may be placed, either against the face, as in FIGS. 1 and 10, or recessed, as in FIG. 17. The adapter may be applied to a wide variety of wheels, exemplified by the slotted disc wheel of FIGS. 1 and 17 and the spoked wheel of FIG. 10. In the latter case the washers may have to be oval as shown at 46, while they may be conventional circular washers for the slotted disc wheels.

It is to be further understood that, while the examples here have illustrated five lug wheels, the present invention is equally applicable to any number of lugs — notably four lug wheels. In similar vein, the diameters given for the bolt circles are merely exemplary, and the invention is equally applicable to any diameter of bolt circle.

It will be appreciated that although particular embodiments of the invention have been shown and described, modifications may be made. It is intended to cover all such modifications which fall within the spirit and scope of the invention in the following claims.

What is claimed is:

1. A custom wheel assembly adapted to be mounted on a variety of automobile hubs having mounting lug bolts protruding therefrom at different bolt circle radii, comprising:
   a wheel having a central portion and a circumjacent rim for supporting a tire, said central portion having holes therethrough for receiving the lug bolts protruding from the hub on which the wheel is to be mounted, each of said holes being large enough to receive lug bolts positioned within a predetermined range of bolt circle radii; and
   an adapter member adapted to be fitted against said central portion and having bores therein, all on a single bolt circle and aligned with the lug bolts of a hub having said single bolt circle, and a plurality of integral bosses formed on said adapter member completely surrounding a respective one of said bores and having an outer dimension adapted to fit snugly within said holes in said central portion.

2. The custom wheel assembly defined in claim 1, in which said adapter member has an annular shape with a central aperture therein.

3. The custom wheel assembly defined in claim 1, in which the central portion of said adapter member extends outwardly to define a hub cap.

4. The combination of claim 1, wherein:
   there is a first and a second and a third adapter member available for use, said first adapter member having a centrally located bore within each of said bosses, said second and third adapter members having oppositely located off-center bores, a single off-center washer being usable with either said second or third adapter member.

5. The custom wheel assembly defined in claim 1, in which said adapter member includes a ring-like portion interconnecting said bosses, and in which said central portion of said wheel has an annular channel therein for receiving said ring-like portion.

6. The custom wheel assembly defined in claim 1, and which includes a plurality of nuts each having a head and a sleeve having an outer diameter corresponding to the diameter of said bores and adapted to be threaded over the lug bolts within said bosses to hold said adapter member in place on said central portion of said wheel and to hold said wheel in place on the hub.

7. The assembly of claim 6 which includes:
   a plurality of washers adapted to be interposed underneath the respective heads of said nuts.

8. The assembly of claim 7 wherein the holes in certain of said washers are off center.

* * * * *